United States Patent
Konopacki, Jr. et al.

(10) Patent No.: US 9,743,421 B2
(45) Date of Patent: Aug. 22, 2017

(54) SIMULTANEOUS OPERATION OF MULTIPLE COMMUNICATIONS PROTOCOLS

(71) Applicant: Disney Enterprises, Inc., Burbank, CA (US)

(72) Inventors: Daniel Michael Konopacki, Jr., Seattle, WA (US); Riyadth Fadhil Al-Kazily, Bainbridge Island, WA (US); John Hubbard Peel, Seattle, WA (US); Gregory J. Strange, Mercer Island, WA (US)

(73) Assignee: Disney Enterprises, Inc., Burbank, CA (US)

( * ) Notice: Subject to any disclaimer, the term of this patent is extended or adjusted under 35 U.S.C. 154(b) by 156 days.

(21) Appl. No.: 14/558,971

(22) Filed: Dec. 3, 2014

(65) Prior Publication Data
US 2016/0165597 A1    Jun. 9, 2016

(51) Int. Cl.
| | |
|---|---|
| *H04W 72/12* | (2009.01) |
| *H04W 72/04* | (2009.01) |
| *H04W 48/16* | (2009.01) |
| *H04W 88/06* | (2009.01) |

(52) U.S. Cl.
CPC ....... *H04W 72/1215* (2013.01); *H04W 48/16* (2013.01); *H04W 72/0446* (2013.01); *H04W 88/06* (2013.01)

(58) Field of Classification Search
CPC ............ H04W 72/1215; H04W 88/06; H04W 72/0446; H04W 48/16
See application file for complete search history.

(56) References Cited

U.S. PATENT DOCUMENTS

| | | | |
|---|---|---|---|
| 2010/0080164 A1* | 4/2010 | Power | H04W 74/02 370/315 |
| 2016/0037443 A1* | 2/2016 | Kim | H04W 48/16 455/438 |

* cited by examiner

*Primary Examiner* — Walter Divito
(74) *Attorney, Agent, or Firm* — Patterson + Sheridan, LLP

(57) ABSTRACT

A method, network communication device, and computer program product are disclosed to perform simultaneous operation of at least a first and second communications protocol. The method includes determining a first frame period for communicating with a first processing device using the first communications protocol, selecting, based on the first frame period, a second frame period for communicating with a second processing device using the second communications protocol, and allocating a portion of the second frame period for communicating with the first processing device using the first communications protocol.

21 Claims, 12 Drawing Sheets

SIMULTANEOUS OPERATION OF MULTIPLE COMMUNICATIONS PROTOCOLS

BACKGROUND

Field of the Disclosure

The disclosure relates to digital communications, and more specifically, the simultaneous operation of two or more communications protocols.

Description of the Related Art

Conventionally, for a particular computing device to communicate with target devices across different types of communications protocols, the computing device includes specialized hardware elements for supporting each individual protocol. The processor of the computing device is coupled to those hardware elements and provides any coordination between the target devices. However, including specialized hardware may not be suitable for certain implementations seeking to lower manufacturing costs, or to lower power consumption of the computing device.

SUMMARY

One embodiment disclosed herein includes a method of simultaneous operation of a plurality of communications protocols. The method includes determining a first frame period for communicating with a first processing device using a first communications protocol. The method also includes selecting, based on the first frame period, a second frame period for communicating with a second processing device using a second communications protocol. The method also includes allocating a portion of the second frame period for communicating with the first processing device using the first communications protocol.

Another embodiment disclosed herein includes a network communication device that includes a processor coupled to a memory. The memory includes a program that operates to determine a first frame period of a first communications protocol of a first processing device, to select, based on the first frame period, a second frame period for a second communications protocol of a second processing device, and to allocate a portion of the second frame period for communicating with the first processing device using the first communications protocol.

Another embodiment disclosed herein includes a computer-readable medium containing program code which, when executed by a processor, performs an operation for simultaneous operation of at least a first and second communications protocol. The operation includes determining a first frame period for communicating with a first processing device using the first communications protocol, selecting, based on the first frame period, a second frame period for communicating with a second processing device using the second communications protocol, and allocating a portion of the second frame period for communicating with the first processing device using the first communications protocol.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
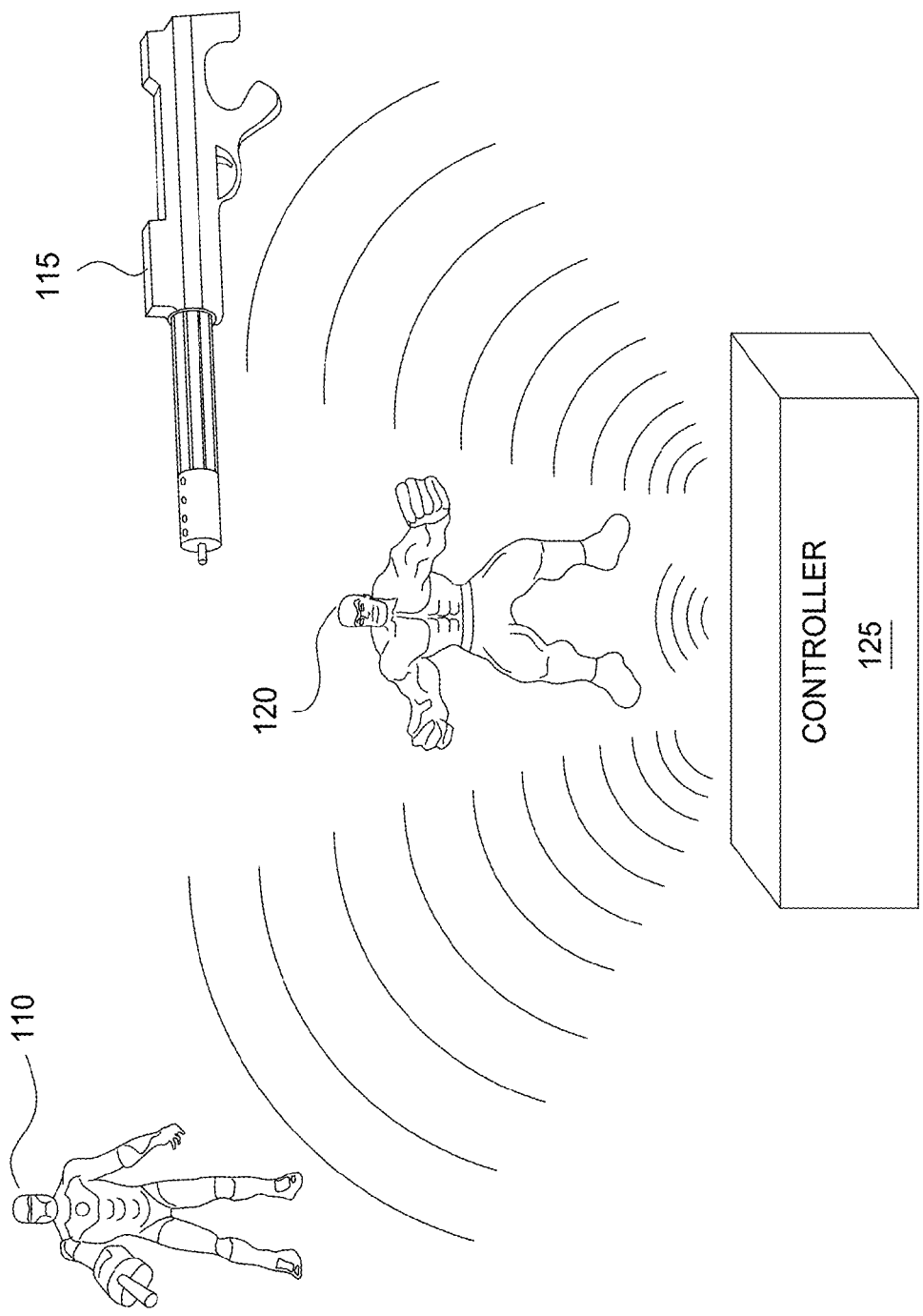
FIG. 1 illustrates a playtime environment in which a controller is instructing interactive devices to perform an effect, according to one embodiment described herein.

Embodiments are generally directed to a method, network communication device, and computer program product that may perform simultaneous operation of a plurality of communications protocols including first and second communications protocols. The method includes determining a first frame period for communicating with a first processing device using the first communications protocol, selecting, based on the first frame period, a second frame period for communicating with a second processing device using the second communications protocol, and allocating a portion of the second frame period for communicating with the first processing device using the first communications protocol.

Using techniques described herein, a processor-based device such as a dedicated coordinator device may operate two or more communications protocols simultaneously, without being required to re-initialize software stacks for each protocol when switching. By adapting one communications protocol to the other protocol through timing coordination and/or timing adjustments, the coordinator device may permit connected devices to communicate across different protocols. In some embodiments, devices using a first protocol may be coupled to an external network, such that adapting the first protocol provides an uplink for the second protocol-based devices to communicate with the external network. The coordinator device may thus support a flexible network implementation for dynamically adding new devices using various communications protocols.

Various embodiments described herein may be used in the context of an interactive playtime environment. A plurality of interactive devices may be used within the environment to perform audiovisual effects responsive to user behaviors, which provide sensory immersion and a sense of enhanced realism for the user. However, to reduce (or to optimize) hardware costs and power consumption, the individual devices may be limited in terms of their audio and visual output capabilities (e.g., capable of outputting sound using a single speaker operating at a particular range of frequencies, capable of outputting light in a limited number of colors, etc.). However, the aggregate effect from multiple devices outputting audiovisual effects in unison can provide a sensorial effect that is greater than that provided by any of the devices individually. To achieve this coordinated effect, the devices generally include at least limited wireless communications capabilities. To provide further reductions in power consumption, wireless protocols may include low-power protocols that are not continuously transmitting and/or receiving.

Moreover, by working in unison, the devices can compensate for each others' weaknesses, thereby producing a greater sensory experience for the user. For example, a particular device may be equipped with a speaker capable of outputting higher frequency sounds and incapable of producing low-frequency sounds (e.g., a tweeter), while another device may include a speaker device capable of producing only lower-frequency sounds (e.g., a sub-woofer). In this example, while neither device may produce an immersive sensory experience individually, the devices can provide a greater sensorial effect when working in unison.

An example will now be discussed with respect to FIG. 1, which illustrates a playtime environment in which a controller is instructing interactive devices to perform an effect, according to one embodiment described herein. As shown, the system 100 includes an Iron Man® action FIG. 110, a Star Wars® blaster rifle 115, a Hulk® action FIG. 120, and a controller device 125. Here, the toys 110, 115, and 120 are generally capable of producing audiovisual effects (e.g., audio output, light effects, movement effects such as vibration, etc.).

Figure 2:
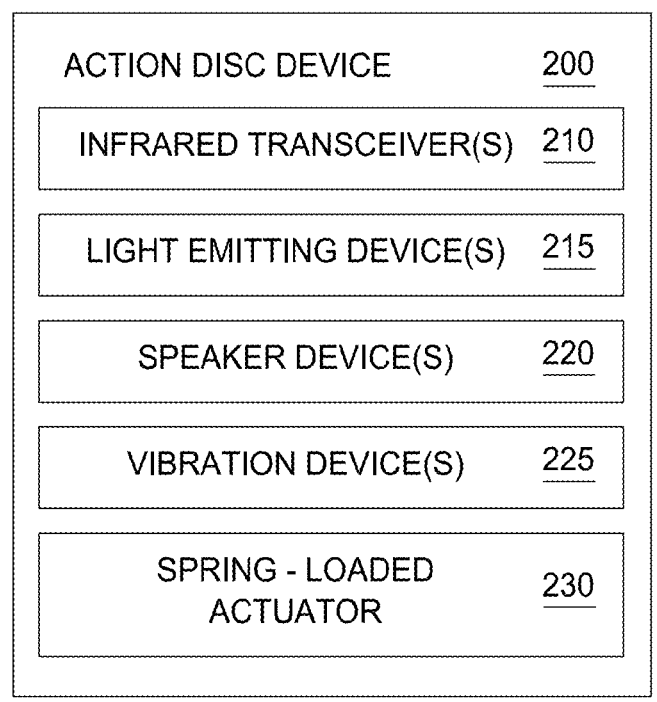
FIG. 2 is a block diagram illustrating an action disc device, according to one embodiment described herein.

While the toy devices 110, 115, and 120 may include hardware resources to perform these audiovisual effects, other embodiments may include toy devices that possess limited or no interactive capabilities. Such embodiments may be preferable, for example, when seeking to minimize the expense of manufacturing the toy devices. In such an embodiment, the interactivity of the toy devices may be achieved by configuring each of the inert toy devices with an action disc device. In one embodiment, the toys 110, 115, and 120 may be configured with an action disc device. An example of such a device is shown in FIG. 2, which depicts an action disc device 200 that includes an infrared transceiver(s) 210, a light-emitting device(s) 215, a speaker device(s) 220, a vibration device(s) 225 and a spring-loaded actuator 230. Generally, the action disc device 200 provides a modular way to incorporate interactivity into a compatible device (e.g., a toy action figure) within a networked ecosystem of devices. For instance, the action disc device 200 could be configured to receive broadcasted commands from the controller device 125 and to perform an audiovisual action in response (e.g., using one or more of the light-emitting devices 215, speaker devices 220, vibration devices 225 and spring-loaded actuator 230).

Advantageously, using a modular device such as the action disc device 200 allows simple, inexpensive toys to be configured to express complex behaviors and to interactively respond to their physical environment, thereby saving money relative to producing more complex toy devices including increased memory, radio-frequency (RF) circuits, and processing capabilities. Additionally, through the use of the spring-loaded actuator 230, the action disc device 200 can help to conserve the cost and drain of the battery (as well as the required size of the battery) by using mechanically stored energy to produce audiovisual effects. For instance, the spring-loaded actuator 230 could be triggered using a cam motion of a low-cost toy motor whose movement causes an object placed on the actuator (e.g., a toy device) to move or fall over. Moreover, the modular nature of the action disc device 200 allows a user to reuse the capabilities of the action disc device 200 by moving the device 200 between toy devices, thus providing additional cost savings relative to incorporating the device's 200 functionality into each and every toy device owned by the user.

For example, the controller 125 could broadcast infrared signals to the action disc device 200 in order to trigger discrete audiovisual effects (e.g., discrete expressions of movement, sound, light etc.). Additionally, the action disc device 200 allows more sophisticated toy devices to control the action disc, in order to render a complex sequence of behaviors via a stream of infrared commands. In one embodiment, the controller 125 employs an infrared protocol that uses a high brightness (e.g., around 100 milliwatt (mW) at 940 nm) infrared light-emitting diodes (LEDs) to propagate carrier modulated signals (e.g., at 38 kilohertz (kHz)) to TSOP infrared receivers in target devices (e.g., another action disc device 200). Such a protocol can allow unicast, broadcast and multicast modes for controlling individual toys (or action discs) or multiple toys (or action discs) in sequence or synchrony. Doing so allows the action discs and their corresponding toy device (i.e., the device to which the action disc is attached) to appear to behave intelligently (e.g., in response to physical stimuli, in response to a context of a story, etc.), even though the action discs can be low cost devices and the logic providing the intelligence can reside elsewhere (e.g., controller 125).

For instance, in one embodiment, more sophisticated toys or the controller device 125 can direct the actions of the action discs via transmitted infrared signals, in order to control the emission of sound, light, and motion from the action disc device 200. Additionally, such infrared signals can trigger scripts or macros stored within program memory or firmware within the action disc device 200, causing the device 200 to perform a sequence of audiovisual effects. Moreover, such infrared signals can even be used to communicate in the absence of line-of-sight between the more sophisticated toy (or controller 125) and the action disc 200, through the use of high power output and sensitive infrared receivers.

Returning now to FIG. 1, while various examples are discussed herein with respect to the toy devices 110, 115, and 120, it is broadly contemplated that these techniques can be utilized with any number of devices and any types of devices, consistent with the functionality described herein.

However, while the toys 110, 115, and 120 are capable of producing audiovisual effects, the toys 110, 115, and 120 may not be configured with logic to determine when conditions in the physical environment indicate a particular effect should be performed. This may be due to, in part, the cost and complexity of configuring each toy 110, 115, and 120 with the logic and hardware resources to detect stimuli in the physical environment and to perform a contextually appropriate audiovisual effect in response synchronously with other devices. As such, the toys 110, 115, and 120 could be configured to receive commands (e.g., from controller 125) and to perform an audiovisual effect(s) responsive to the received commands. Doing so allows the toys 110, 115, and 120 to be produced much more economically, while maintaining the capability to perform audiovisual effect(s) as part of a storytelling or playtime experience.

For example, as part of a Star Wars® storytelling experience, the storyline could indicate that devices within the physical environment should play a particular sound effect when the user performs a predefined gesture to use the "force." As such, the controller 125 could monitor the user's behavior to detect when the user has performed the predefined gesture. For example, the controller 125 could use one or more camera devices (e.g., within the controller devices 125, within one or more of the toys 110, 115, and 120, etc.) to monitor the user's movement within the physical environment. As another example, the user could wear an article (e.g., a bracelet) configured with an accelerometer device and capable of reporting data describing the user's movement to the controller device 125.

Upon detecting the user has performed the predefined gesture, the controller 125 could broadcast a command to the toy devices 110, 115, and 120, instructing the toy devices 110, 115, and 120 to synchronously perform an audiovisual effect. Such a command could be broadcast, for example, via a radio-frequency transmitter, an infrared emitter, an ultrasound transmitter, and so on. More generally, any communications protocol may be used for the communication between the controller and the toy devices 110, 115, and 120, consistent with the functionality described herein.

The toy devices 110, 115, and 120 could then receive the command and could perform the specified audiovisual effect in synchrony. For example, in the event the command specifies to play a particular sound effect, each of the toy devices 110, 115, and 120 could output the particular sound effect in synchrony with the other toy devices, thereby creating an improved sensorial experience for the user, relative to any of the toy devices 110, 115, and 120 playing the sound effect individually. Here, the sound effect could be, e.g., a sampled sound effect or a function-generated sound effect. Moreover, as discussed above, by playing the sound effect synchronously with one another, the toy devices 110, 115, and 120 can compensate for each other's weaknesses (e.g., a particular toy device being capable of outputting sounds within a limited frequency range), thereby producing an improved sound effect and sensorial immersion for the user.

While any number of toy devices can be used, the sense of immersion experienced by the user generally scales with the number of devices performing audiovisual effects in synchrony. For example, the controller 125 could detect when the user pulls the trigger to fire the blaster gun 115, and in response, could broadcast a command to all of the toy devices 110, 115, and 120 to output the sound effect of the blast being fired. Additionally, the controller 125 could instruct the toy devices 110, 115 and 120 to perform additional audiovisual effects, such as flashing lights and movements, in response to the user firing the blaster. Doing so helps to overload the user's senses, thereby creating a more immersive and realistic playtime experience.

Generally, a variety of techniques may be used to configure the toy devices 110, 115, and 120 to synchronously output the audiovisual effect. In one embodiment, the toy devices 110, 115, and 120 could be configured to output the audiovisual effect immediately upon receiving the command from the controller 125. Such an embodiment may be preferable when the toy devices 110, 115, and 120 receive the command at substantially the same time and when the toy devices 110, 115, and 120 take substantially the same amount of time to process the command and to perform the corresponding audiovisual effect. As another example, each of the toy devices 110, 115, and 120 (as well as the controller 125) could maintain an internal clock whose time is synchronized to the internal clock of the other toy devices, and the command transmitted by the controller 125 could specify a time at which to perform the audiovisual effect. Generally, any technique suitable for use in synchronizing the internal clocks may be used, consistent with the present disclosure.

Examples of such techniques include, without limitation, Network Time Protocol (NTP), Precision Time Protocol (PTP), Reference Broadcast Time Synchronization, and so on.

In one embodiment, a package containing one or more of the toy devices 110, 115, and 120 (e.g., within a retail sales environment) can be adapted to produce audiovisual effects as well. For example, an action disc (e.g., the action disc device 200) including a vibro-acoustic exciter could be attached to the package, and could utilize a physical cavity within the package to produce low-frequency bass sounds, in essence acting as a woofer or a subwoofer. Doing so allows the package to be reused as part of the play experience (i.e., rather than being discarded, as with conventional packaging), while also producing sounds at lower frequencies than can easily be produced on the toy devices 110, 115, and 120. Additionally, the low-frequency sounds produced by the package could be used for other purposes as part of the playtime experience, such as vibrating items placed on top of the package.

In addition to synchronously performing audiovisual effects, the controller 125 may instruct the toy devices 110, 115, and 120 to each perform different effects in unison or according to a determined schedule. For instance, the controller 125 could create the illusion of a moving sound by scheduling each of the toy devices 110, 115, and 120 to play a sound effect according to a determined schedule or to play sound effects in unison that give the appearance of a moving sound. As an example, the controller 125 broadcast commands to create a panning effect in which the amplitude, spectral content (e.g., Doppler effects), and phase of sounds emerging from differing toy devices 110, 115, and 120 are adjusted to localize sounds in a dynamic trajectory among the different toys. Here, the controller 125 could move the localized sounds through the physical environment to simulate the user shooting the blaster rifle 115 and the blaster beam moving from one toy device to the next until ultimately reaching its target. Doing so provides a more realistic experience for the user, particularly compared to only the blaster device 115 outputting a sound effect indicating the blaster has been fired.

As discussed above, in addition to synchronously playing sound effects, the toy devices 110, 115, and 120 may be configured to reinforce these acoustical effects with other audiovisual effects such as simultaneous light effects and physical motions. For example, the controller 125 could broadcast a command(s) instructing the toy devices 110, 115, and 120 to perform respective movements (e.g., activating a light-emitting device within the respective toy device) according to a determined schedule, in order to produce a phi phenomenon optical illusion in which the user perceives continuous motion between the toy devices. Such an effect could be coupled with the movement of the sound effect produced through dynamic variations in the phase, intensity and spectral content of the sounds played by the different toy devices 110, 115, and 120. In addition to the sound and movement emanating from a source to a destination, the controller 125 could broadcast commands creating the illusion of an object (e.g., a virtual blast fired from the toy blaster device 115) hitting the target and then ricocheting off of the target in a determined direction. Doing so produces a much more powerful illusion of the user actually firing the blaster device 115, thereby improving the playtime experience.

Within a playtime environment, such as the playtime environment 100 depicted in FIG. 1, the interactive devices and controller may include hardware that supports communicating using a plurality of different communications protocols. To reduce energy consumption and perhaps hardware complexity, the devices may be configured to communicate using low-power communications protocols. Besides supporting communication with the interactive devices, the controller may offer other network connectivity, such as connections to a larger network (e.g., a local access network (LAN), a wide area network (WAN), or the internet). The connections may be used to extend the playtime environment from the controller and interactive devices to include other networked computing devices, such as a desktop, laptop, or handheld computing device. In some embodiments, the playtime environment may be extended to include remote interactive devices to support interactions with multiple remote users. The other computing devices may provide a graphical depiction of various aspects of the playtime environment using a connected display device, for example displaying avatars that correspond to the interactive devices. The computing devices may provide another means for a user to interact with the environment through the computing devices' various input devices (e.g., keyboard, mouse, touchscreen, etc.).

While the controller may support external network connectivity in addition to the interactive devices of the playtime environment, communications to/from the interactive devices of the playtime environment with the external network(s) may traditionally require a processing stage to be performed by the controller to convert communications from a first protocol-compliant format to another format. For example, this may include adding or removing header/footer information from the communicated data, translating portions of the data, segmenting or joining portions of the data, etc.

Figure 3:
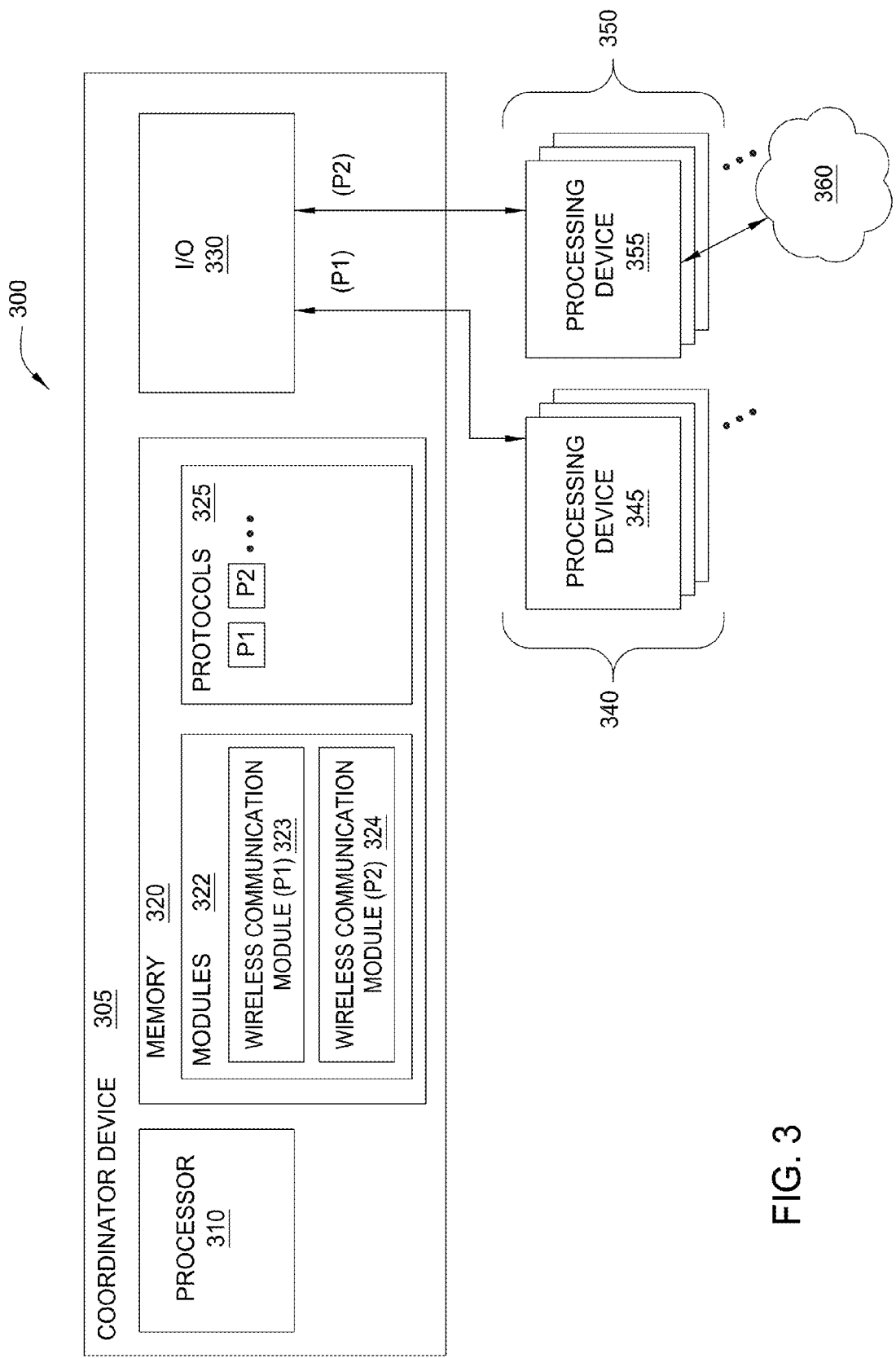
FIG. 3 illustrates a networked coordinator device operating a plurality of communications protocols simultaneously, according to one embodiment.

However, in various embodiments disclosed herein, devices using one communications protocol may communicate with devices (or onto a network) using another communications protocol without requiring an intermediate processing step. This may be particularly advantageous for low-power protocols, such as "always-off" protocols that are not continuously transmitting and receiving. FIG. 3 illustrates a networked coordinator device operating a plurality of communications protocols simultaneously, according to one embodiment. As shown in network configuration 300, a coordinator device 305 communicates with first processing devices 345 using a communications protocol P1, and second processing devices 355 using a second communications protocol P2. The coordinator device 305 may be any suitable computing device for performing the functions described herein. Examples include personal computers, such as desktop computers, laptop computers, netbook computers, tablets, web browsers, e-book readers, and personal digital assistants (PDAs). In one embodiment, the coordinator device 305 may include the controller 125. Other examples include communication devices, such as mobile telephones, and media devices (including recorders, editors, and players such as televisions, set-top boxes, music players, digital photo frames, and digital cameras). The coordinator device 305 may generally manage network control and administration functions, which may be implemented as a distinct computing device (e.g., a router) or any computing device that includes this functionality (e.g., a personal computing device operating network administration software).

Coordinator device 305 generally includes a processor 310, memory 320, and input/output (I/O) 330. Processor 310 may include any processing element capable of performing the functions described herein. While depicted as a single element within coordinator device 305, processor 310 is included to be representative of a single processor, multiple processors, a processor or processors having multiple cores, as well as combinations thereof. Memory 320 may include a variety of computer readable media selected for their size, relative performance, or other capabilities: volatile and/or non-volatile media, removable and/or non-removable media, etc. Memory 320 may include cache, random access memory (RAM), storage, etc. Memory 320 may include one or more discrete memory modules, such as dynamic RAM (DRAM) dual inline memory modules (DIMMs). Of course, various memory chips, bandwidths, and form factors may alternately be selected. Storage included as part of memory 320 may typically provide a non-volatile memory for the coordinator device 305, and may include one or more different storage elements such as Flash memory, a hard disk drive, a solid state drive, an optical storage device, and/or a magnetic storage device.

Memory 320 may include one or more modules 322 for performing the functions described herein. Modules 322 may generally contain program code that is executable by the processor 310. As shown, modules 322 include wireless communication module 323 (corresponding to protocol P1), and wireless communication module 324 (corresponding to protocol P2). Memory 320 may include a plurality of communications protocols 325, which as shown include at least the protocols P1 and P2. The program code included in modules 322 may include code for initializing and operating protocol stacks for each of communications protocols 325. During operation of the coordinator device 305, the coordinator device 305 may operate two or more protocol stacks simultaneously by providing appropriate timing coordination and/or adjustment to the protocols, so that the protocol stacks need not be stopped and restarted each time the coordinator device 305 switches protocols to communicate with another networked processing device.

While the simultaneous operation of two protocols is shown and described throughout, embodiments described herein may be adapted to allow any number of data communication protocols to operate simultaneously. In some embodiments, the coordinator device 305 may switch between different sets of protocols in simultaneous operation, and/or may be capable of simultaneously operating three or more protocols for communicating with various processing devices. In cases including three or more protocols, two or more of the communication protocols may be "aware" of the other protocols' timing, while at least one communication protocol operates without awareness of any other protocols.

The processor 310 may communicate with other devices, such as peripheral devices or other networked computing devices, using input/output (I/O) 330. I/O 330 may include any number of different I/O adapters or interfaces used to provide the functions described herein. I/O 330 may include wired and/or wireless connections, and may use various formats or protocols. As shown, the processor 310 through I/O 330 may communicate with one or more first processing devices 345 using a first protocol P1 (e.g., group 340), and may communicate with one or more second processing devices 355 using a second protocol P2 (e.g., group 350). Protocols 325 may include any suitable protocols for wired or wireless communications. These protocols 325 may include one or more "always-off" protocols that are not continuously transmitting and receiving. Protocols 325 may include protocols that are compliant with known standards, as well as proprietary network protocols (which may be derived from standards, or different altogether). In one embodiment, one of the protocols 325 may be compliant with, or at least based on, the Institute of Electrical and Electronics Engineers (IEEE) 802.15.4™ standard for wireless personal area networks (802.15.4™ is a trademark of IEEE). In one embodiment, one of the protocols 325 may be compliant with or based on Bluetooth® low energy (BLE) technology (Bluetooth® is a registered trademark of the Bluetooth Special Interest Group). Both protocols generally offer low power consumption, which may be beneficial for interconnecting the various sensor devices, computing devices, and communications devices that are routinely worn or carried by individuals, or interacted with.

Processing devices 345, 355 may include any suitable computing device, such as the examples provided above for coordinator device 305. In some embodiments, processing devices 345, 355 may include one or more sensor devices that operate to capture data from their environment. The sensor devices may be implemented as wearable technology, such as activity trackers. The sensor device generally may require low power consumption.

In one embodiment, a group 350 may be connected to an external network 360, while the group 340 is not connected to the external network. For example, sensor devices may be configured to communicate using only a low-power protocol, and may be unable to communicate with networks which require higher power consumption (e.g., an 802.11 wireless network). Network 360 may include one or more networks of various types, including a local area or local access network (LAN), a general wide area network (WAN), and/or a public network (e.g., the Internet). The coordinator device 305 may adapt protocol P2 based on the properties of protocol P1, such as the packet content and transmission timing, which may allow the P1-based processing devices 345 of group 340 to communicate with any of the P2-based computing devices 350 of group 350 and with other nodes of the network 360 (e.g., as an uplink to the Internet). The processing devices 345, 355 may generally be coupled to the coordinator device 305 in one of two roles (master or slave). For example, a processing device 345 using a first protocol (e.g., BLE) may initiate a connection with the coordinator device 305 (for example, when the processing device 345 is brought within a predetermined range), establishing the processing device 345 in the master role and the coordinator device 305 may operate in the slave role. The coordinator device 305 may adapt the timing of a second protocol (e.g., 802.15.4-based) using the timing dictated by the BLE protocol. In this way, the coordinator device 305 may incorporate the specific communication timing windows (or discrete communication events) established by the BLE protocol within the timing of the second protocol. Additional details of adapting communications protocols are discussed below with respect to FIGS. 5A-6B.

Figure 4A:
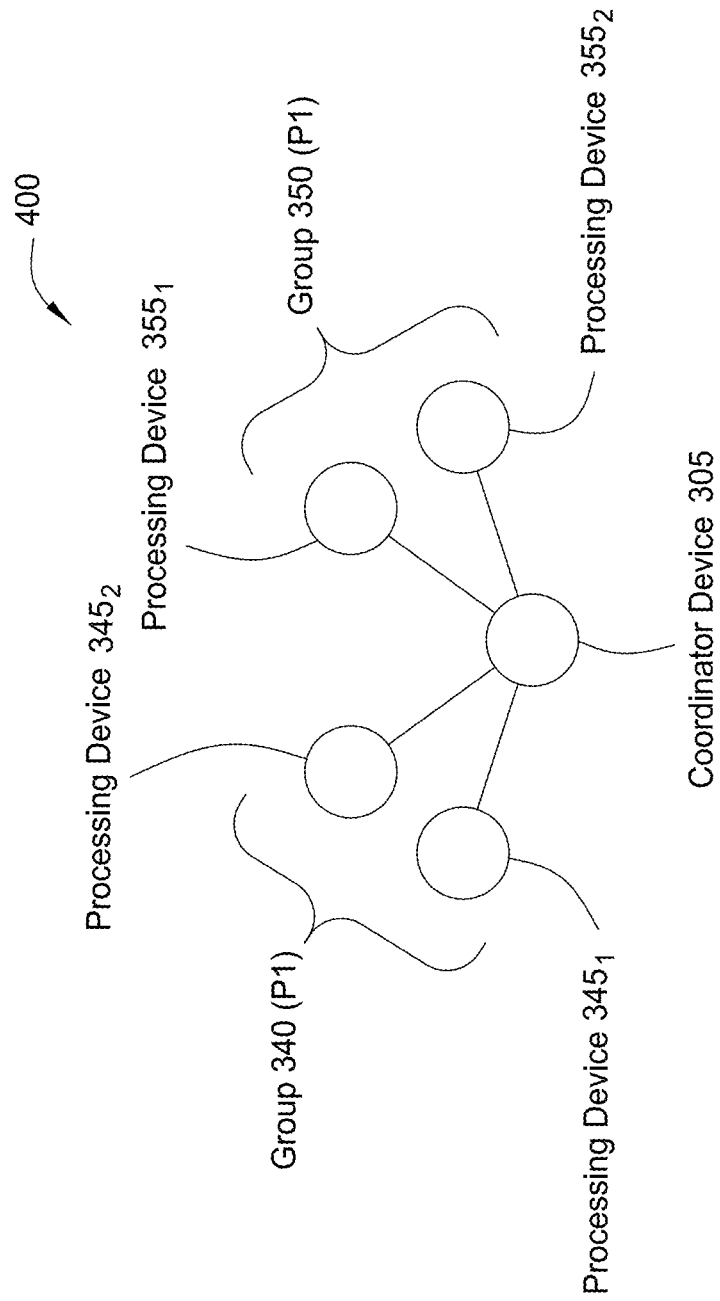
FIGS. 4A-4C illustrate various network topologies including a coordinator device, according to embodiments described herein.
Figures 4B, 4C:
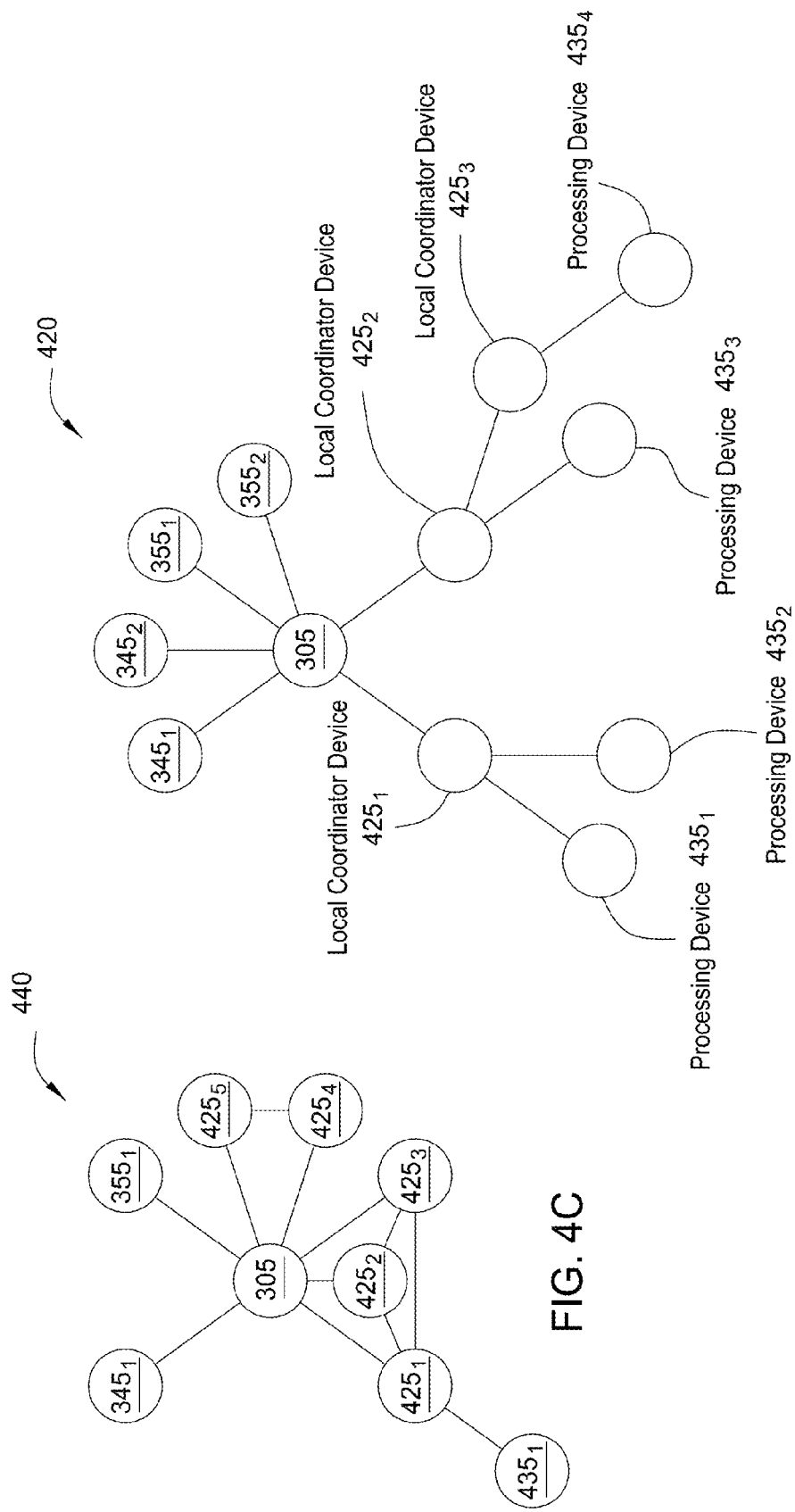

FIGS. 4A-4C illustrate various network topologies including a coordinator device, according to embodiments described herein. FIG. 4A depicts network 400 having a star topology. In network 400, the coordinator device 305 acts as a central hub connected in a point-to-point connection with other network nodes. As shown, the network 400 further includes a plurality of processing devices $345_{1,2}$ configured to communicate using a first protocol, and a plurality of processing devices $355_{1,2}$ configured to communicate using a second protocol.

FIG. 4B depicts network 420 having a tree topology. In network 420, the coordinator device 305 acts as a central node in a hierarchical structure with other nodes of the network. The nodes may include a plurality of processing devices $345_{1,2}$ and a plurality of processing devices $355_{1,2}$ coupled directly (i.e., in a point-to-point configuration) with the coordinator device 305, as well as one or more levels of local coordinator devices $425_{1,2,3}$. In turn, each local coordinator device may couple to another local coordinator device (e.g., $425_3$) and/or to one or more processing devices $435_{1,2,3,4}$. The local coordinator devices $425_{1,2,3}$ and processing devices $435_{1,2,3,4}$ may communicate using one of the same protocols used for processing devices $345_{1,2}$, $355_{1,2}$, or may communicate using one or more different protocols. Based on the timing provided by one or more of the processing devices $345_{1,2}$, $355_{1,2}$, the coordinator device 305 may in turn dictate the timing for other communications protocols in the network 420. The local coordinator devices $425_{1,2,3}$ generally comply with the timing set by the coordinator device 305, and may provide other network services to such as handling requests from processing devices seeking to join the network, and relaying messages to/from coupled processing devices $435_{1,2,3,4}$. In one embodiment, the coordinator device 305 receives timing information from a first processing device 345, 355 using a first protocol, and adapts timing for a second protocol based on the first protocol timing information. In turn, a local coordinator 425 may similarly adapt timing of a third protocol based on the adapted second protocol timing. The processing device 435 may operate using the third protocol, and by providing one or more levels of coordination, the processing device may be able to communicate with other devices on the network that operate using different protocols. However, to provide the various advantages described herein, timing adaptations made by local coordinators 425 should remain consistent with the centralized timing set by coordinator device 305.

FIG. 4C depicts network 440 having a mesh topology. In network 440, the coordinator device 305 is one node in a fully connected or partially connected mesh. As shown, network 440 is a partially connected mesh that includes a plurality of processing devices $345_1$, $355_1$ as well as a plurality of local coordinator devices $425_{1-5}$. Each local coordinator device 425 may couple to other local coordinator devices and/or to one or more processing devices 435. The local coordinators may provide timing adaptation for various protocols, consistent with the descriptions provided above.

Figure 5A:
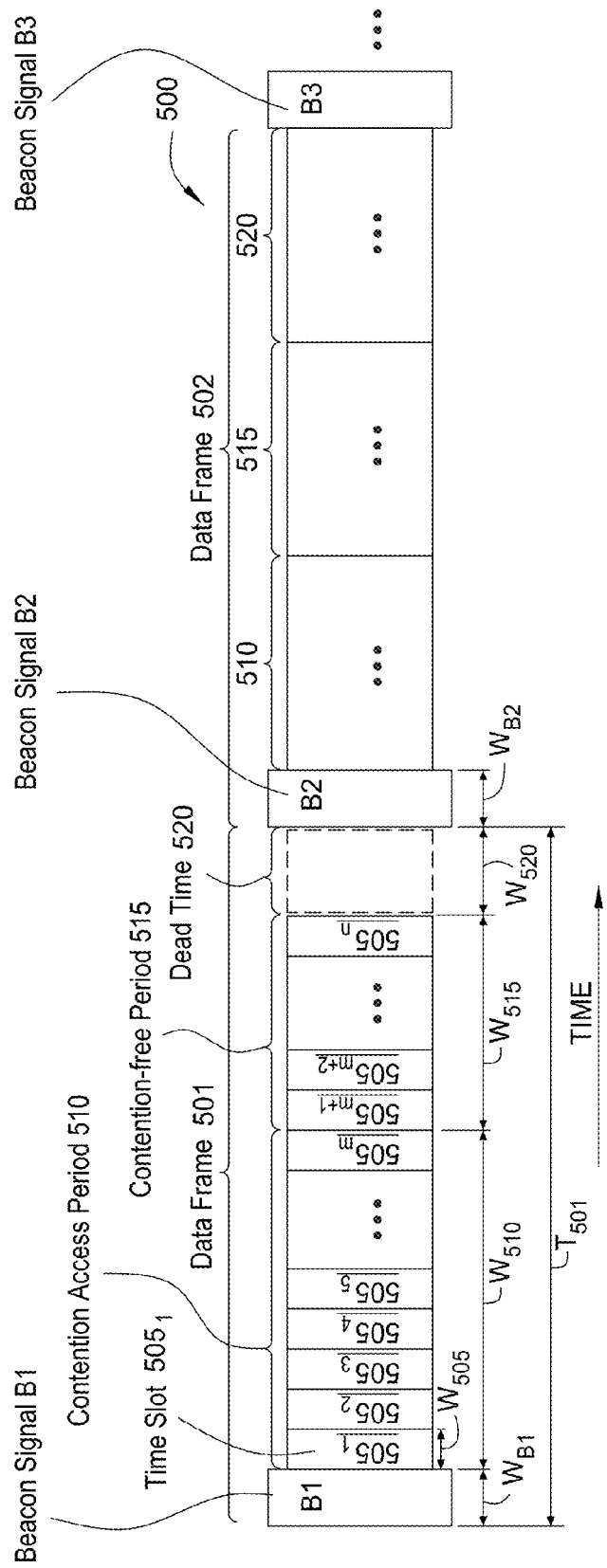
FIGS. 5A-5C illustrate timing aspects for simultaneous operation of a plurality of communications protocols, according to embodiments described herein.
Figure 5B:
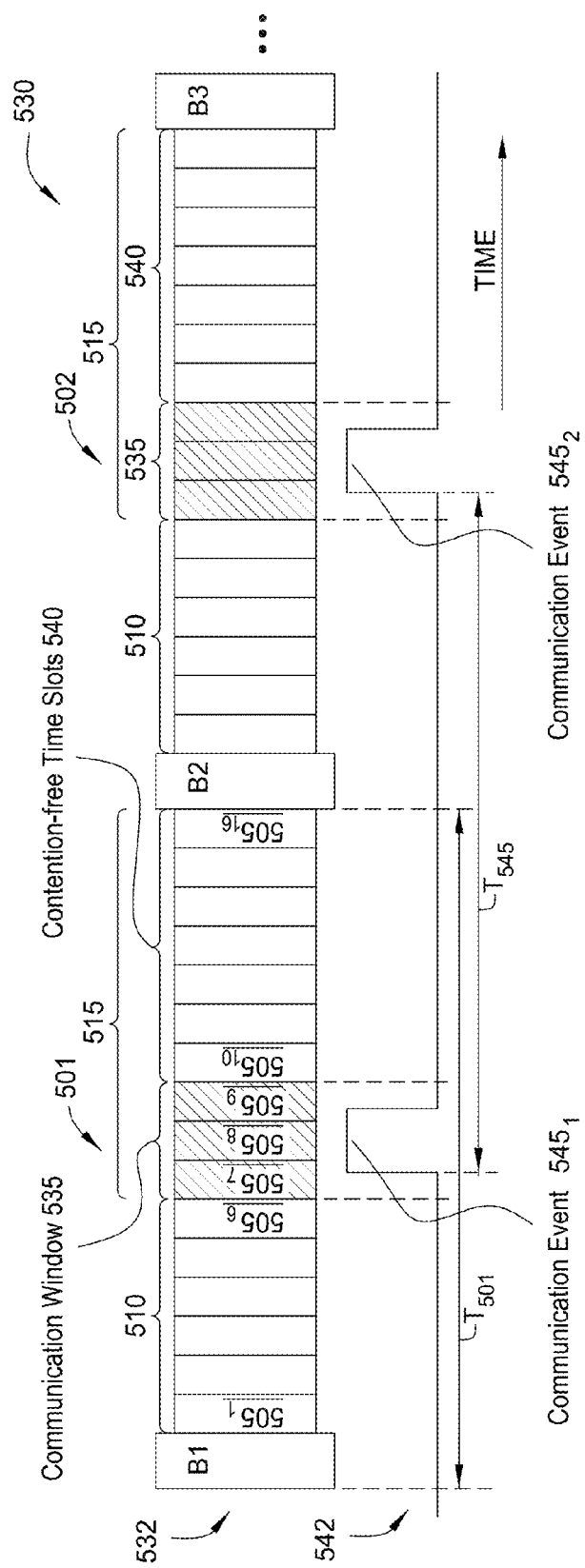
Figure 5C:
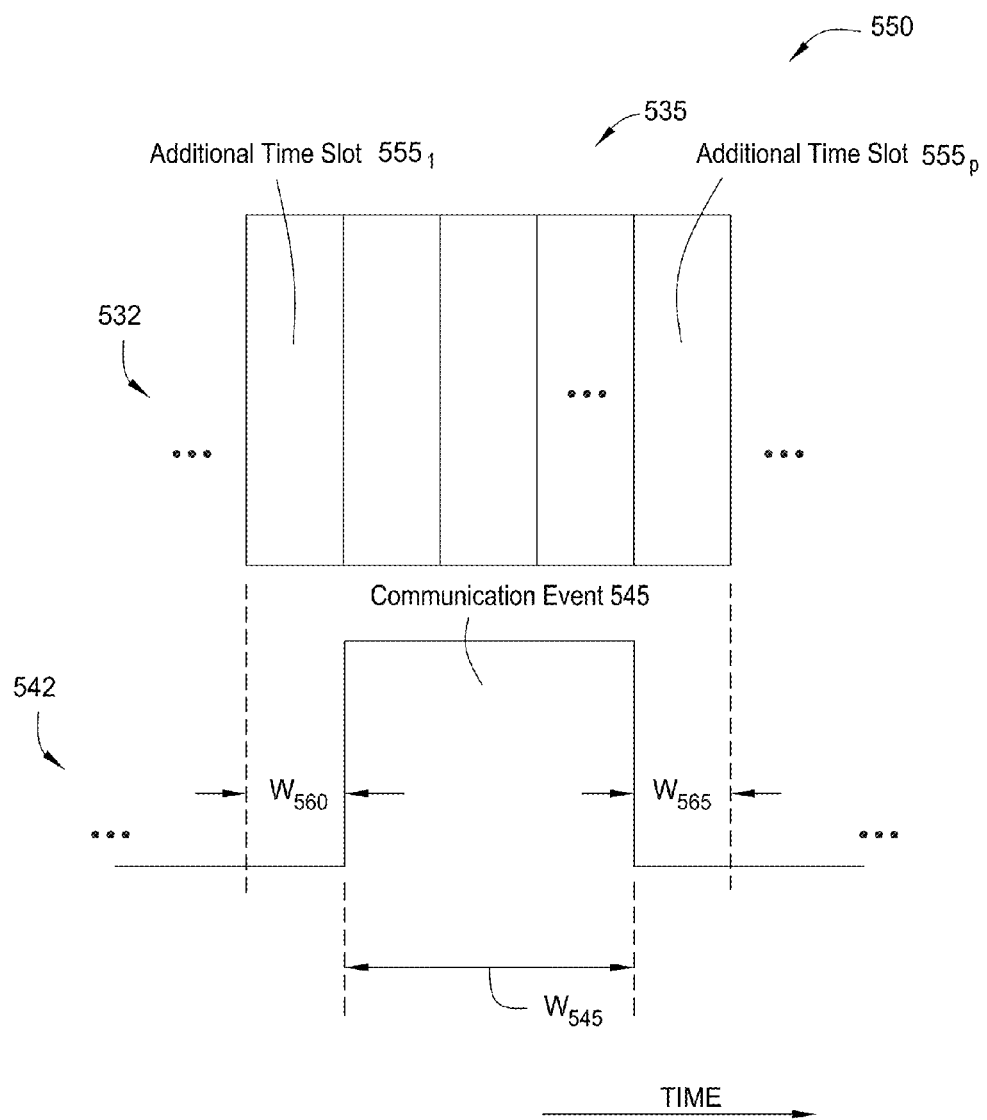

FIGS. 5A-5C illustrate timing aspects for simultaneous operation of a plurality of communications protocols, according to one embodiment. Generally, FIG. 5A illustrates a timing diagram 500 similar to the timing of the IEEE 802.15.4 protocol.

Timing diagram 500 includes two sets of data frames, labeled 501, 502. The timing diagram 500 also includes periodic beacon signals B1, B2, B3. These signals contain timing information used to synchronize data communication between nodes on the network. Beacon signals may also contain configuration information for different network nodes. Each data frame 501, 502 may be defined by successive beacon signals (e.g., frame 501 is bounded by B1 and B2, frame 502 by B2 and B3, and so forth) and has a frame period (e.g., $T_{501}$). Frames may be divided into a number of discrete time slots, during which nodes may communicate over the network. As shown, frame 501 includes n time slots $505_n$. In one embodiment, each frame may include 16 time slots; however, other numbers of time slots are possible. Each time slot may generally have a time duration corresponding to "width" $w_{505}$. In one embodiment, each time slot has the same duration, which may be selectable (in some cases, dynamically selected). In an alternate embodiment, time slots within a frame may have different durations. The beacon signal leading a frame may contain the time slot information for the frame, such as number of time slots and/or duration. The duration of the time slots may be equal to the duration of the beacon signals (e.g., $w_{B1}$, $w_{B2}$), or may differ.

The frame may be divided into portions. For example, a first number of time slots (m) may be used as a contention access period 510 (having an amount of time corresponding to "width" $w_{510}$). During the contention access period 510, networked devices may attempt to communicate or request dedicated time slots from the coordinator device. During contention access period 510, collision avoidance techniques may be applied to communications to minimize any risk of collision caused by packets being sent in the same channel from different network nodes at overlapping times. These collision avoidance techniques may include, prior to sending its communications, a node first performing an assessment to determine whether the channel is currently busy. Following the contention access period 510, a number of time slots (n-m) may be used as a contention-free period 515 (corresponding to "width" $w_{515}$). During the contention-free period nodes may communicate without applying collision avoidance techniques. The time slots of the contention-free period, or groupings of multiple time slots are also known as "guaranteed time slots."

In some cases, the cumulative duration of the beacon signal and the time slots of a frame may be less than the complete duration of the frame. This may happen regularly in the case of same-sized time slots, where any adjustment of time slot duration must be multiplied by the number of the time slots (e.g., 16x) within a single frame. Accounting for the beacon signal and time slots, any balance of time remaining within a frame period may be left as dead time 520 having width $w_{520}$. During the dead time 520, communications between network nodes does not occur. As discussed below, the time slot duration, dead time, and timing of the beacons may be preferentially selected (or adjusted) to accommodate the timing requirements of another communications protocol, which beneficially allows the simultaneous operation of two (or more) protocols.

The guaranteed time slots allow portions of a frame to be assigned by the coordinator device 305 to a communication between a first network device (such as processing device 345, 355) and a second network device. The two network devices may then directly communicate during the assigned frame portions without requiring communication via the coordinator device 305. Network devices request the guaranteed time slots, and the coordinator device 305 allocates and deallocates the time slots in response to such requests. The guaranteed time slots may also include directional information (i.e., transmitting or receiving, relative to the device). Information regarding the allocation or deallocation of guaranteed time slots is generally transmitted within the beacon signal for a frame, and may include a start time slot, a slot length, and device address information.

FIG. 5B illustrates a timing diagram 530 comparing the timing of a first and second protocol (as shown by signal plots 532, 542), according to one embodiment. As shown, signal plot 532 represents an 802.15.4-compliant protocol and signal plot 542 represents a BLE protocol. During operation, coordinator device 305 communicates with devices on a network using a first protocol (e.g., similar to plot 532). A processing device using the second protocol may initiate a connection with the coordinator device, which may establish the processing device in a master role for the second protocol and the coordinator device in a slave role for the second protocol. The second protocol may have a frame period (or periodicity, time interval, etc.) set by the processing device or perhaps defined by protocol standards. The master role allows the processing device to dictate that frame period/periodicity/interval to the coordinator device in the slave role. That is, the relative roles require the coordinator device to adapt to the timing requirements of the processing device. In an alternative embodiment, the roles of each device in the second protocol may be reversed. The coordinator device 305 may operate as a (BLE) master and the coupled processing device may operate in a (BLE) slave role. Even in this case, the coordinator device 305 may operate to adjust the first protocol relative to the second protocol.

Further, the BLE protocol typically communicates in short windows, which may correspond to discrete communication events included in the protocol. Such a feature may also be found in other protocols offering low power consumption. The BLE protocol includes parameters that dictate the time interval between consecutive communication events, as well as a number of consecutive communication events for which the slave device (here, the coordinator device) not need to listen to the master device for timing updates.

In plot 542, the time period $T_{545}$ represents the time interval between subsequent communication events $545_1$, $545_2$ of the second protocol. The coordinator device may determine the frame period of the second protocol and adjust accordingly the frame period of a first protocol (represented by $T_{501}$) or the relative alignment of the first protocol with the second protocol.

In some embodiments, the coordinator device may compare the determined frame period of the second protocol to a predetermined threshold value to determine a ratio of second protocol communication events to frame periods of the first protocol. The threshold value may represent a target frame period for the first protocol. Thus, if the second protocol operates faster than the target frame rate of the first protocol (i.e., the frame period of the second protocol is shorter than that of the first protocol), the coordinator device may increase the ratio of communication events (second protocol) to frame periods (first protocol). After determining the ratio, the coordinator device may set the frame period of the first protocol and/or shift frames of the first protocol relative to the second protocol.

In one embodiment, the coordinator device may set the frame period of the first protocol to equal the frame period of the second protocol (e.g., $T_{501}=T_{545}$). Alternatively, the frame period of the first protocol may be set to accommodate a preferred number of second protocol communication events per frame period, which may be an integer ratio (1:1, 2:1, 3:1, 4:1, 8:1, etc.) or a non-integer ratio (3:2, 5:3, 2.5:1, etc.).

As shown, the coordinator device selects $T_{501}$ to approximately equal $T_{545}$. As a result, each frame period of the first protocol corresponds to one communication event of the first protocol (i.e., a 1:1 ratio). As discussed above, the first protocol may include a contention access period 510 having one or more time slots ($505_1$-$505_6$) and a contention-free period 515 having one or more time slots ($505_7$-$505_{16}$). To avoid requiring collision avoidance measures, the communications events 545 of the second protocol can be aligned to occur during the contention-free period 515. To that end, the width of the contention access period may be selected (in some cases, may be dynamically varied) so that the desired number of communications events 545 fit within the desired number of frames 501, 502. Additionally, the timing of the first protocol may be adjusted relative to the first protocol (e.g., a frame shift) to align communications events 545 to contention-free periods 515 of the first protocol. For example, if a communication event 545 was expected to fall within a contention access period 510, the coordinator device may delay a next beacon signal (e.g., by adding dead time to a current frame). Doing so may "push" the expected communication event to occur within a contention-free period in a subsequent frame. Of course, the coordinator device could also advance a beacon signal, or adapt the dead time or time slot duration to accommodate the communication event.

In addition to selecting the frame period or shifting frames of the second protocol timing, the coordinator device may determine a number of time slots to accommodate an entire communication event of the second protocol. For example, assume coordinator device determines that communication event $545_1$ requires three time slots (based on $w_{545}$ and any other processing requirements). In response, as shown in frame 501, the coordinator device allocates three time slots $505_{7-9}$ as the communication window 535 for the second protocol, and the remaining contention-free time slots (or guaranteed time slots) 540 remain available for other network traffic. Of course, the time slots for the communication window may be allocated from any portion of the contention-free period 515, and the first protocol may be shifted to align the communication windows appropriately. In this example, as the frame periods for the two protocols are approximately equal, the communications windows correspond to the same time slots in subsequent frames. However, communication windows may correspond to different time slots in different frames in other cases.

FIG. 5C illustrates a timing diagram 550 comparing the timing of first and second protocols (as shown by signal plots 532, 542) according to one embodiment. As shown, a communication event 545 in signal plot 542 has a time duration depicted as width $w_{545}$. To support the simultaneous operation of the two protocols, the coordinator device may require additional time in the communication window 535 before and/or after the communication event, which in some cases may require allotting additional time slots 555. For example, a leading buffer of width $w_{560}$ may be selected to allow the processor adequate time to switch from the second protocol's software stack to the first protocol's stack prior to communicating using the first protocol. Beyond switching software stacks, the leading buffer width $w_{560}$ may also include a period in which the coordinating device stands by for the (BLE master) processing device to initiate communication using the second protocol. A trailing buffer of width $w_{565}$ may also be provided for corresponding software stack switching, but a corresponding standby period is generally not necessary as the coordinating device may immediately return to communicating using the first protocol.

Receiving these inputs, the coordinator device sums their values. After summing the widths of the communication event 545 and leading and trailing buffers (i.e., $w_{560}+w_{545}+w_{585}$), a minimum number of time slots 555 of the first protocol to allot for the communication window 535 may be determined. Based on the summed width, p is the minimum number of time slots for the communication window 535, but p+1 slots may be selected for allotment if the communication window 535 is time-shifted to the left or right relative to the first protocol.

Figure 6A:
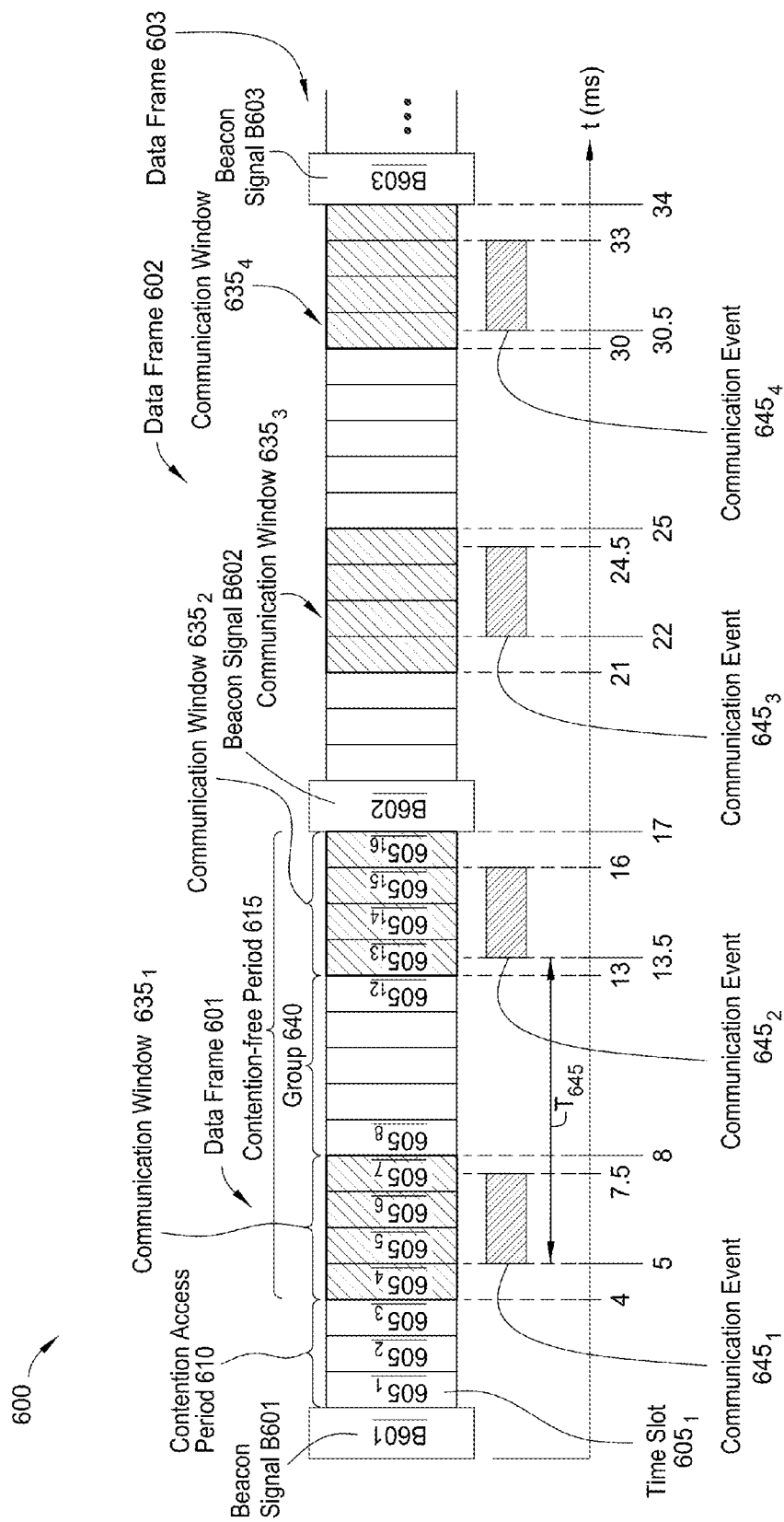
FIGS. 6A and 6B illustrate timing configurations for simultaneously operating multiple communications protocols, according to embodiments described herein.
Figure 6B:
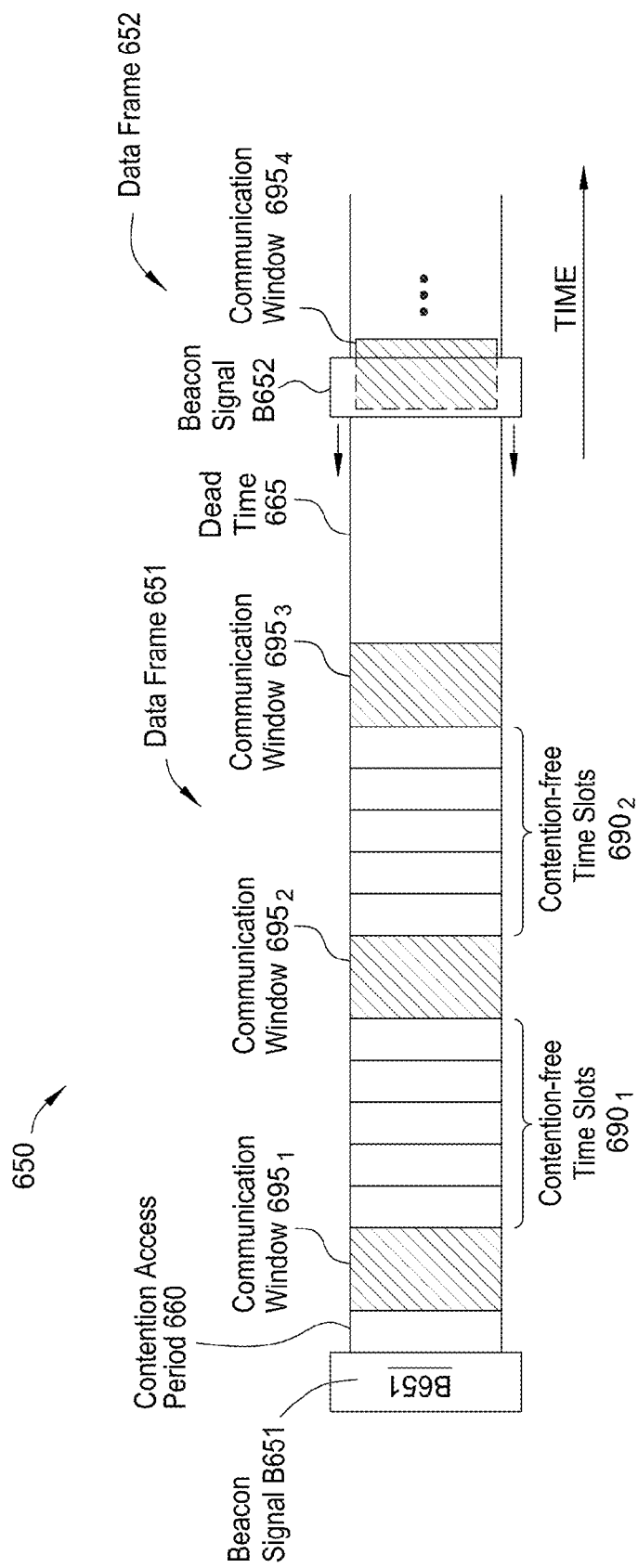

FIGS. 6A and 6B illustrate timing configurations for simultaneously operating multiple communications protocols, according to one embodiment. In timing diagram 600, two communications events occur within a single frame of the other protocol (i.e., in a 2:1 ratio). The frame period of the first protocol $T_{645}$ is 8.5 milliseconds (ms), and the width of each communication event 645 is 2.5 ms. Assume further for this example that leading and trailing buffers for the communication event 645 are each 0.5 ms, meaning that the communication window 635 must be at least 3.5 ms (i.e., 2.5 ms+0.5 ms leading+0.5 ms trailing).

After determining that the frame period of 8.5 ms is smaller than a target threshold value for the second protocol (e.g., 15 ms), the coordinator device sets the frame period of the second protocol to 17 ms (or, $2 \times T_{645}$), with time slots 605 and the beacon signals B401, B402, etc. each being allotted 1 ms. Of course, the frame period and time slot duration values including values of dead time within a frame may be selected as appropriate for an individual case.

As shown, the coordinator device determines that at a minimum, 4 time slots (at 1 ms each, totaling 4 ms) should be used for each communication window $635_1$, $635_2$. Next, the coordinator device selects a width of contention access period 610 within frame 601 based on the number of time slots needed for the communications windows 635 within a contention-free period 615 of frame 601.

Here, to maintain the 8.5 ms frame period corresponding to $T_{645}$ across multiple frames 601, 602, 603, the coordinator device allots slots $605_{4-7}$ and $605_{13-16}$ for communications windows $635_{1,2}$ for the first protocol. Thus, contention-free period 615 includes thirteen contiguous time slots 605. Specifically, a group 640 of contention-free time slots are dedicated for other network traffic, leaving a block of three time slots 605 used during contention access period 610. Note that the coordinator device may align the communication events $645_{1,2}$ to occur at the same time within their respective communications windows $635_{1,2}$, but doing so is not required. As shown, the communication event $645_1$ occurs 1 ms into the communication window $635_1$, while communication event $645_2$ occurs 0.5 ms into the communication window $635_2$. Note that aligning the communications protocols over multiple frames depends on the timing of time slots 605 as well as the timing of beacon signals B601, B602, B603, etc. Moreover, persons of ordinary skill will recognize that the timing variables discussed above, while interdependent, may be determined in different orders or one or more variables determined simultaneously.

As shown in FIG. 6A, communication events occur at regular times (or time slots) within frames 601 and 602. In some embodiments, however, the timing variables for the second protocol may be selected such that the communication events occur at differing times within each frame. For example, this could correspond to a non-integer ratio of communication events to frame periods (such as 2.5:1, 5:3, or any other suitable ratio), a gradual shifting left or right of the communication events over subsequent frames, and so forth. As discussed above, aligning the communications protocols so that communications events of the first protocol do not occur at undesired times in the second protocol (which at a minimum may include the beacon signal periods and contention access periods), the coordinator device may adjust frame periods, relative frame alignment, time slot widths, dead time, and so forth. In one embodiment, the size of contention access periods may be variable across multiple frames. In another embodiment, certain frames of the second protocol may not include communication events, e.g., where doing so would specifically coincide with scheduled beacon signals or contention access periods to leading into a frame.

Further, it is possible that even a preferred set of timing variables may not completely eliminate the possibility of communication events coinciding with undesired times of the second protocol, other properties of the frame may be adjusted to accommodate a preferred number of communication events, while avoiding the problems of alignment with undesired times in the second protocol. For example, if a communication event of the first protocol is expected to occur during an undesired time (e.g., during a beacon signal or contention access period) of the second protocol, the coordinator device may dynamically delay a subsequent beacon signal for a particular frame, e.g., by adding usable time slots to the frame for communication events or by adding dead time. Alternatively, the coordinator device may adjust a number of time slots per frame.

For example, FIG. 6B illustrates an example timing diagram for simultaneous operation of multiple communications protocols, according to one embodiment. In timing diagram 650, frame 651 includes a beacon signal B651, a contention access period 660 followed by a first communication window $695_1$, a first plurality of contention-free time slots $690_1$, a second communication window $695_2$, a second plurality of contention-free time slots $690_2$, a third communication window $695_3$, and an amount of dead time 665 before the next beacon signal B652 begins frame 652. Timing diagram 650 generally represents the timing of one protocol to accommodate a second protocol within the communication windows 695. The dynamically adjusted frame 651 may be used in conjunction with the series of calculations performed above to determine preferred values of timing variables. In one embodiment, the coordination device may include one adjusted frame 651 after a fixed number of non-adjusted frames. In another embodiment the coordinator device includes an adjusted frame 651 after determining a timing adjustment is needed. The amount of dead time 665 in the adjusted frame 651 may be selected so that a first communication window $695_4$ of the subsequent frame 652 is properly aligned within the frame 652. For example, the communication windows 695 may be set according to a periodicity of the accommodated protocol (e.g., BLE). Although three communication windows $695_{1-3}$ fit within a single frame 651, timing of a fourth communication window $695_4$ may overlap with the next beacon signal B652. Accordingly, the amount of dead time 665 may be shortened, which causes beacon signal B652 to be shifted to the left (i.e., earlier in time). This prevents the overlap of the beacon signal B652 with the communication window $695_4$ and may also allow communication window $695_4$ to have a preferred alignment within frame 652 (e.g., the dead time 665 may be selected such that the communication windows $695_4$ occurs after the beacon signal B652 and a contention access period).

Figure 7:
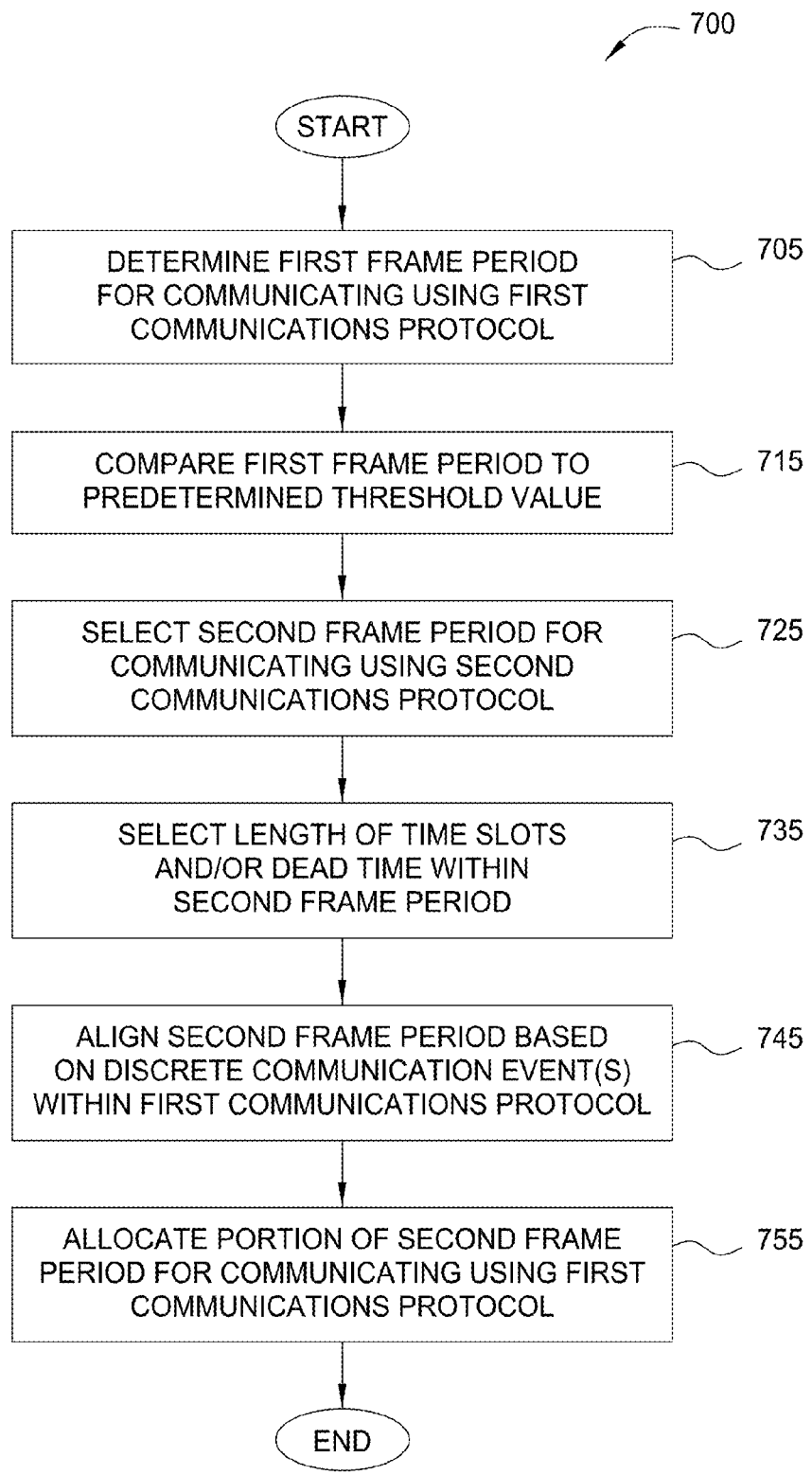
FIG. 7 illustrates a method of simultaneous operation of a plurality of communications protocols, according to embodiments described herein.

FIG. 7 illustrates a method of simultaneous operation of a plurality of communications protocols, according to embodiments described herein. Method 700 may generally be used by a coordinator device, consistent with the descriptions provided above.

Method 700 begins at block 705, where a first frame period is determined for communicating using a first communications protocol. The first protocol may be used by a processing device communicating with the coordinator device. The processing device may be connected to the coordinator device in a master role and dictate timing requirements for using the first communications protocol. The first protocol may be an "always-off" protocol that does not continuously transmit and receive data and may communicate in discrete communication events (e.g., as used for low-power-consumption protocols). In one embodiment, the first communications protocol is compliant with Bluetooth® low energy (BLE) technology.

At block 715, the determined first frame period is compared to a predetermined threshold value. The threshold value may represent a preferred target frame period for a second protocol. If the first frame period is smaller than the threshold value (meaning the first protocol is operating faster than preferred), the coordinator device may determine whether to adjust the ratio of communication events of the first protocol to align with frame periods of the second protocol.

At block 725, the second frame period for communicating using the second protocol is selected. The second frame period may be selected based on the first frame period and/or a determined ratio of communication events to frame periods of the second protocol. The second protocol may be a beaconing protocol that transmits a beacon signal for regularly synchronizing network devices. In one embodiment, the second protocol is 802.15.4-compliant or 802.15.4-based.

At block 735, the length of time slots and/or dead time occurring within the second frame period is selected. In some embodiments, the second protocol may dictate a fixed number of time slots per frame period (e.g., 16). Where time slots share a common duration, adjusting the duration may result in a remainder amount of time within the frame period. This remainder time may be designated as dead time at the end of a frame. In some embodiments, the dead time may itself be adjusted to provide a preferred alignment between the first and second protocols.

At block 745, the second frame period is aligned based on one or more discrete communication events within the first communications protocol. Specifically, the timing of the second protocol may be shifted around those communication events so that the events do not occur during undesired portions of second protocol, such as beacon signaling periods and contention access periods in which exclusive communications between processing device and coordinator device cannot be ensured.

At block 755, a portion of the second frame period is allocated for communicating using the first protocol. The portion may generally correspond to parts of the second frame period occurring proximate to the communication events (e.g., overlapping with the events or immediately adjacent to). This may include calculating a minimum number of time slots based on the duration of the communication event(s) and any buffering requirements of the processor of the coordinator device.

Figure 8:
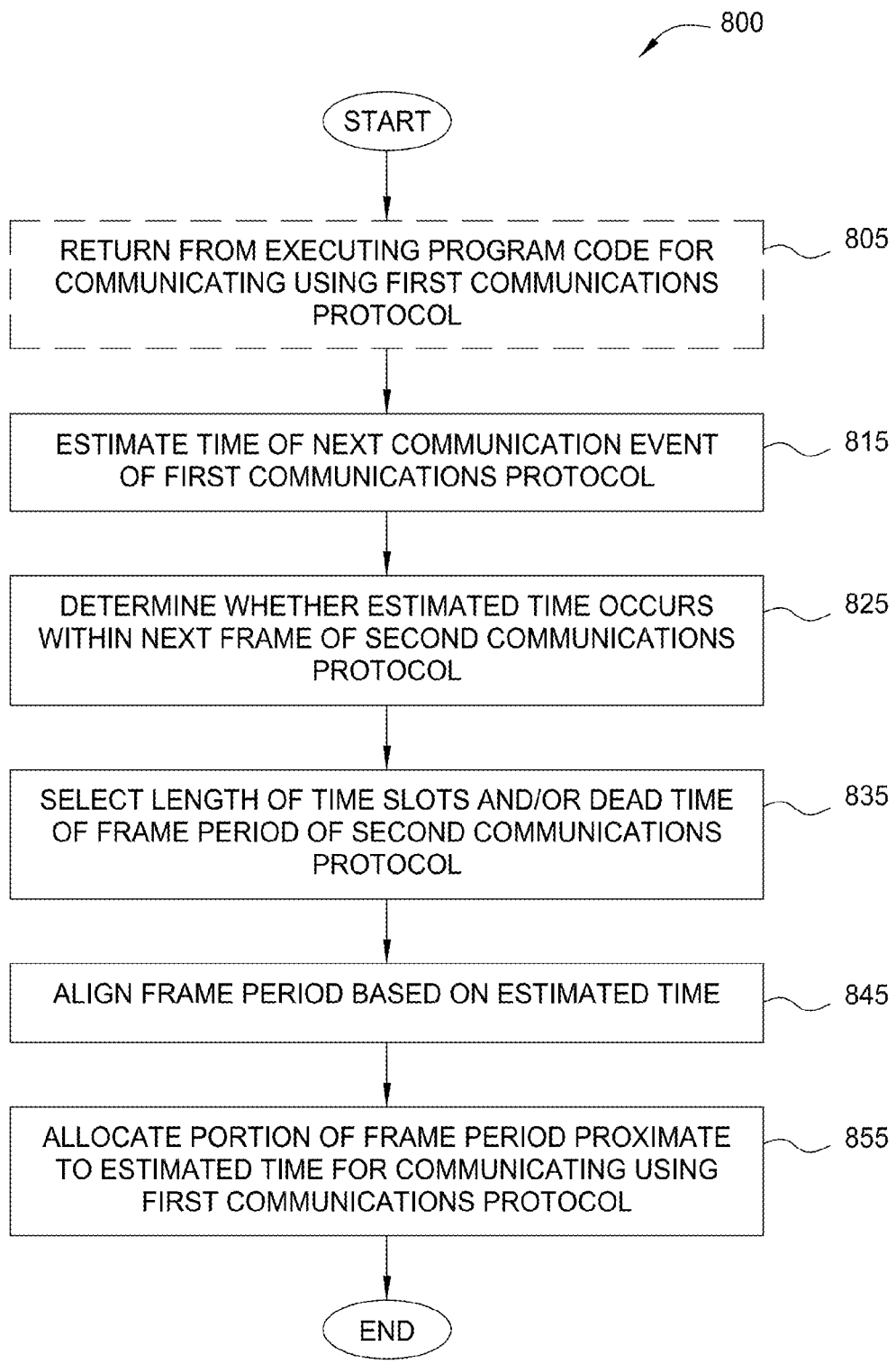
FIG. 8 illustrates a method of updating timing during simultaneous operation of a plurality of communications protocols, according to embodiments described herein.

FIG. 8 illustrates a method of updating timing during simultaneous operation of a plurality of communications protocols, according to embodiments described herein. Method 800 may generally be used by a coordinator device, consistent with the description provided above.

Method 800 begins (optionally) at block 805, where a processor returns from executing first program code for communicating using a first communications protocol. The processor may be included in a coordinator device, and returning from executing the first program code may include resuming execution of second program code for communicating using a second communications protocol.

At block 815, a time of the next communication event of the first communications protocol is estimated. This may be done using parameters set within the first communications protocol and/or through setting a counter in the coordinator device (such as may be included with the processor).

At block 825, it is determined whether the estimated time of the next communication event of the first protocol will occur within the next frame period of the second communications protocol. In one embodiment, if the next communication event will occur later than the next frame period, block 825 may periodically loop until it is determined that the next communication event will happen during the next frame period.

At block 835, a length of time slots and/or a length of dead time of a frame period of the second communications protocol are determined. The frame period of the second communications protocol may also be determined in conjunction with this block, or may have been determined previously.

At block 845, the frame period of the second communications protocol is aligned based on the estimated time. Specifically, the timing of the second protocol may be shifted around the next communication event of the first protocol so that the event does not occur during undesired portions of second protocol, such as beacon signaling periods and contention access periods in which exclusive communications between processing device and coordinator device cannot be ensured.

At block 855, a portion of the second frame period that is proximate to the estimated time for communicating is allocated. Specifically, the portion may include parts of the second frame period that are overlapping with the communication event (or immediately adjacent to). Allocating a portion of the second frame period may include calculating a minimum number of time slots based on the duration of a communication event and any processing-related buffer periods, as well as the relative positioning of the communication event within the time slots.

In the preceding, reference is made to embodiments of the disclosure. However, it should be understood that the disclosure is not limited to specific described embodiments. Instead, any combination of the following features and elements, whether related to different embodiments or not, is contemplated to implement and practice aspects of the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in the claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of operation of a first communication protocol within a network of a plurality of networked devices communicating using a second communication protocol, the method comprising:
  establishing a communicative connection between a first processing device and a coordinator device of the plurality of networked devices using the first communication protocol;
  determining a first frame period associated with the first communication protocol;
  selecting, based on the first frame period, a ratio of predefined communication events of the first communication protocol to data frames of the second communication protocol, wherein data frames of the second communication protocol are each defined by successive beacon signals;
  selecting, using the coordinator device and based on the selected ratio, a second frame period for a plurality of data frames to be communicated using a second processing device of the plurality of networked devices using the second communication protocol, wherein selecting the second frame period comprises delaying a beacon signal for at least one of the plurality of data frames; and
  allocating, for each data frame of the plurality of data frames, a portion of the second frame period for communicating with the first processing device using the first communications protocol.

2. The method of claim 1, wherein the second frame period comprises a plurality of discrete time slots.

3. The method of claim 2, wherein allocating a portion of the second frame period comprises:
  determining one or more consecutive time slots from the plurality of discrete time slots sufficient to include a predefined communication event of the first communication protocol.

4. The method of claim 1, wherein selecting the ratio comprises:
  comparing the first frame period with a predetermined threshold value representing a target frame period for the second communication protocol; and
  increasing, when the first frame period is less than the predetermined threshold value, the selected ratio from a default ratio value to a second ratio value.

5. The method of claim 1, wherein each data frame of the plurality of data frames comprises at least a beacon period and a contention-free period, wherein the allocated portion of the second frame period comprises the contention-free period, the method further comprising:
  aligning a timing of the plurality of data frames such that the predefined communication events of the first communication protocol occur within the contention-free period of each data frame.

6. The method of claim 5, wherein each data frame further comprises a contention access period between the beacon period and the contention-free period,
  wherein aligning a timing of the plurality of data frames comprises selecting a length of the contention access period for each data frame.

7. The method of claim 6, wherein selecting a length of the contention access period for each data frame comprises:
  including information for the selected length within a beacon signal transmitted during the beacon period.

8. The method of claim 6, wherein aligning a timing of the plurality of data frames further comprises:
  upon determining that at least one predefined communication event of the first communication protocol would occur during the beacon period or the contention access period of a first data frame of the plurality of data frames, increasing a frame period of the first data frame from the second frame period.

9. The method of claim 8, wherein increasing a frame period of the first data frame from the second frame period comprises adding one or more discrete time slots to the first data frame.

10. The method of claim 8, wherein increasing a frame period of the first data frame from the second frame period comprises increasing an amount of dead time within the first data frame.

11. A network communication device for operating a first communication protocol within a network of a plurality of networked devices communicating using a second communication protocol, the network communication device comprising:
  a processor; and
  a memory coupled to the processor, the memory including program code which, when executed by the processor, operates to:
    establish a communicative connection with a first processing device using the first communication protocol;
    determine a first frame period associated with the first communication protocol;
    select, based on the first frame period, a ratio of predefined communication events of the first communication protocol to data frames of the second communication protocol, wherein data frames of the second communication protocol are each defined by successive beacon signals;

select, based on the selected ratio, a second frame period for a plurality of data frames to be communicated using a second processing device of the plurality of networked devices using the second communication protocol, wherein selecting the second frame period comprises delaying a beacon signal for at least one of the plurality of data frames; and allocate, for each data frame of the plurality of data frames, a portion of the second frame period for communicating with the first processing device using the first communications protocol.

12. The network communication device of claim 11, wherein the second frame period comprises a plurality of discrete time slots, and wherein allocating a portion of the second frame period comprises:

determining one or more consecutive time slots from the plurality of discrete time slots sufficient to include a predefined communication event of the first communication protocol.

13. The network communication device of claim 11, wherein selecting the ratio comprises:

comparing the first frame period with a predetermined threshold value representing a target frame period for the second communication protocol; and increasing, when the first frame period is less than the predetermined threshold value, the selected ratio from a default ratio value to a second ratio value.

14. The network communication device of claim 11, wherein the program code further operates to:

upon switching from communicating using the first communication protocol to communicating using the second communication protocol, set a value to a counter that represents an estimate of a time until a next predefined communication event of the first communication protocol.

15. A non-transitory computer-readable medium containing program code which, when executed by a processor, performs an operation for operation of a first communication protocol within a network of a plurality of network devices communicating using a second communications protocol, the operation comprising:

establishing a communicative connection with a first processing device using the first communication protocol;

determining a first frame period associated with the first communication protocol;

selecting, based on the first frame period, a ratio of predefined communication events of the first communication protocol to data frames of the second communication protocol, wherein data frames of the second communication protocol are each defined by successive beacon signals;

selecting, based on the selected ratio, a second frame period for a plurality of data frames to be communicated using a second processing device of the plurality of networked devices using the second communications protocol, wherein selecting the second frame period comprises delaying a beacon signal for at least one of the plurality of data frames; and allocating, for each data frame of the plurality of data frames, a portion of the second frame period for communicating with the first processing device using the first communications protocol.

16. The computer-readable medium of claim 15, wherein the second frame period comprises a plurality of discrete time slots, and wherein allocating a portion of the second frame period comprises:

determining one or more consecutive time slots from the plurality of discrete time slots sufficient to include a predefined communication event of the first communication protocol.

17. The computer-readable medium of claim 15, wherein selecting the ratio comprises:

comparing the first frame period with a predetermined threshold value representing a target frame period for the second communication protocol; and increasing, when the first frame period is less than the predetermined threshold value, the selected rate from a default ratio value to a second ratio value.

18. The computer-readable medium of claim 15, the operation further comprising:

upon switching from communicating using the first communication protocol to communicating using the second communication protocol, estimating a time until a next predefined communication event of the first communication protocol.

19. The computer-readable medium of claim 15, wherein each data frame of the plurality of data frames comprises at least a beacon period and a contention-free period, wherein the allocated portion of the second frame period comprises the contention-free period, the method further comprising:

aligning a timing of the plurality of data frames such that the predefined communication events of the first communication protocol occur within the contention-free period of each data frame.

20. The computer-readable medium of claim 19, wherein each data frame further comprises a contention access period between the beacon period and the contention-free period, wherein aligning a timing of the plurality of data frames comprises selecting a length of the contention access period for each data frame.

21. The computer-readable medium of claim 20, wherein selecting a length of the contention access period for each data frame comprises:

including information for the selected length within a beacon signal transmitted during the beacon period.

* * * * *